C. P. BENEDICT.
Sewing Machine.
No. 83,596.  Patented Nov. 3, 1868.
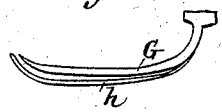
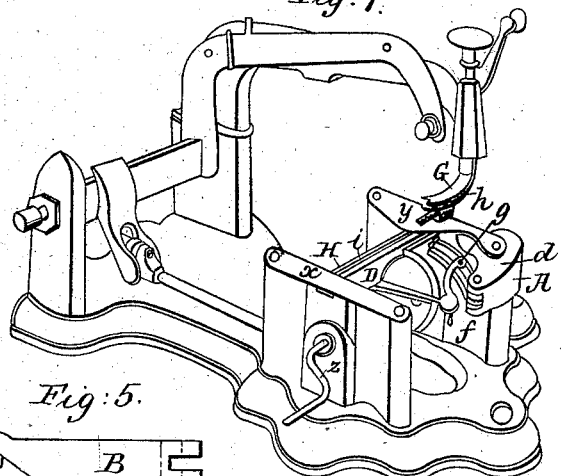
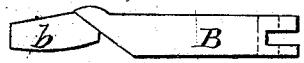
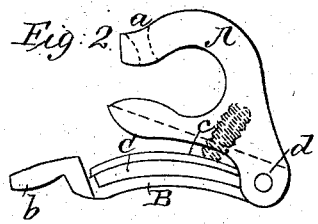
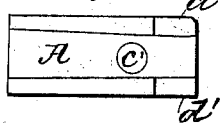
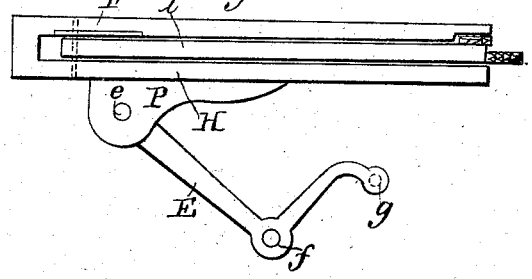
Witnesses.
C. A. Dingui
Edward E. Aston
Inventor.
Chas P. Benedict

CHARLES P. BENEDICT, OF HOBOKEN, NEW JERSEY.

Letters Patent No. 83,596, dated November 3, 1868.

IMPROVEMENT IN SEWING-MACHINE.

The Schedule referred to in these Letters Patent and making part of the same.

*To all whom it may concern:*

Be it known that I, CHARLES P. BENEDICT, of Hoboken, in the county of Hudson, and State of New Jersey, have invented a new and useful Improvement in Feeding-Mechanism for Sewing-Machines; and I do hereby declare the following to be a full, clear, and exact description thereof, reference being made to the accompanying drawings, and the figures and letters of reference thereon, forming part of this specification.

Figure 1 of the drawings is a view of the mechanism attached to a "Wheeler & Wilson" sewing-machine, the cloth-plate being removed therefrom, to show the parts more plainly, and the two plates $x\ y$ substituted to retain the feed-bar in place.

Figures 2, 3, 4, 5, and 7 are detail views of the mechanism detached from the machine.

Figure 6 is a view of the presser-foot.

Similar letters of reference indicate like parts in the several drawings.

My invention consists in a novel manner of constructing and arranging the feeding-mechanism of a "four-motion" feed, whereby I am enabled to make it perfectly noiseless in its operation, and capable of being directly attached to any sewing-machine containing such a feed, as well as of being embodied in the construction of new machines.

To enable others skilled in the art to make and use my invention, I will describe its construction and manner of operation.

The block A, the form of which is clearly represented in the drawings, is constructed of proper size and shape to grasp the frame of the machine, and it is secured thereto by means of a set-screw working in the hole $a$ of the block.

The levers B C, which, in connection with the arm E, impart the horizontal or forward-and-back motion to the feed, are hinged to the block A, by the screw $d$, and the end, $b$, of the former one is held in direct contact with the face of the feed-cam by means of the coil-spring $c$.

The arm E, pivoted to the plate D, on the side of the feed-bar H, is provided with a handle, $f$, and also a pin, $g$, which works in the slot between the two levers B C, one of which is hinged at $d$, and kept in contact with the pin $g$ by the action of a spring, $c$. The form of this arm is plainly shown in fig. 7.

The presser-foot G is made with a light spring-plate, $h$, attached to its under side, the object of which is to produce a gradual contact of the feeder, in its upward motion, with the presser-foot, so that the noise of the feeder, in striking against the under side of the foot, is entirely obviated.

On the side of the feed-bar H is attached a small spring, F, which acts to prevent the bar $i$ from dropping too suddenly in its downward motion, and holds it up until pressed down by the spring-plate $h$.

This mode of constructing and applying the several parts of the mechanism enables the feed to operate in an effective manner, while, at the same time, all noise of the parts, in striking against each other, that is made by other mechanism, is entirely avoided.

The mechanism being properly attached to the machine, and power applied thereto, its operation will be as follows:

The levers B C being moved forward by the cam, or other part of the machine communicating motion to the feeding-mechanism, a forward movement will be imparted to the feeder $i$, by the arm F being drawn forward by the levers B C, and carrying with it the feed-bar H.

This forward motion is continued for the required distance, until the highest part of the periphery of the feed-cam, withdrawing from contact with the under side of the feeder $i$, will allow the feed-points to be pressed down below the cloth-plate of the machine by the spring $h$. The form of the face of the cam will then permit the levers B C to be thrown back by the coil-spring $c$, and the arm E will move the feed-bar back beneath the cloth-plate. The feeder being then pressed upward by the cam, the above motions will be repeated, and the cloth fed along in a regular manner to receive the stitches.

The forward-and-back movements of the feeder, by which the length of the stitches is controlled, is regulated by the arm F, pivoted to the feed-bar at $e$, as, the greater the distance the pin $g$ is placed from the pivot $d$, the greater will be the horizontal movement of the feeder, and, consequently, the longer the stitch, and *vice versa*.

Having thus fully described my invention,

What I claim, and desire to secure by Letters Patent, is—

1. The slotted lever B C, having one of its jaws so constructed that it shall always hold and keep the pin $g$, on the arm E, in contact with the other jaw, by a spring-pressure, substantially as set forth and specified.

2. The frame A, and vibrating slotted lever B C, constructed substantially as described, so that it may be readily attached to a four-motion-feed sewing-machine, in co-operative relation with the feeder thereof, substantially as and for the purposes set forth and specified.

3. The combination, with a reciprocating feeder, of the vibrating slotted lever B C, constructed as described, so that said lever shall always be in contact with the ordinary feed-cam of a four-motion-feed sewing-machine, without making or breaking contact therewith, substantially as described and set forth.

4. The supplementary presser-foot or spring $h$, in combination with a reciprocating feeder, H, and vibrating slotted lever B C, constructed and operating substantially as described and specified.

CHAS. P. BENEDICT.

Witnesses:
C. A. DURGIN,
EDWARD E. OSBORN.